United States Patent [19]

Poultney

[11] 4,433,245
[45] Feb. 21, 1984

[54] FRAUNHOFER LINE DISCRIMINATOR

[75] Inventor: Sherman K. Poultney, Wilton, Conn.

[73] Assignee: The Perkin-Elmer Corporation, Norwalk, Conn.

[21] Appl. No.: 342,613

[22] Filed: Jan. 25, 1982

[51] Int. Cl.$^3$ ............................................. F21V 9/16
[52] U.S. Cl. .................................. 250/458.1; 250/253
[58] Field of Search ................ 250/253, 363 R, 458.1, 250/459.1, 461.1

[56] References Cited

U.S. PATENT DOCUMENTS

| | | | |
|---|---|---|---|
| 3,598,994 | 8/1971 | Markle | 250/363 |
| 3,641,344 | 2/1972 | Markle | 250/458.1 X |
| 3,769,516 | 10/1973 | Markle et al. | 250/363 |
| 4,336,459 | 6/1982 | Fay | 250/461.1 |

Primary Examiner—Davis L. Willis
Attorney, Agent, or Firm—F. L. Masselle; E. T. Grimes; Thomas P. Murphy

[57] ABSTRACT

An apparatus for the detection of fluorescence. An airborne optical system carried in an aircraft or spaceship scans a sunlit swath of terrain over a field of view defined by a selected one of the fringe rings of a Fabry-Perot etalon designed to pass a selected Fraunhofer line. A first series of detectors are disposed to sense light intensity over a predetermined arc within said selected ring. A second like series of detectors are disposed to sense light intensity just outside said selected ring. Electronic means are connected to said first and second plurality of detectors for determining the fluorescence reflected from the swath of terrain.

13 Claims, 3 Drawing Figures

FRAUNHOFER LINE DISCRIMINATOR

BACKGROUND OF THE INVENTION

Fraunhofer line discriminators are systems for sensing, measuring and recording fluorescence reflected from certain materials in a scene viewed in sunlight. Such instruments became feasible with the discovery that sunlight reflected from the earth contains the identical Fraunhofer absorption lines which exist in direct sunlight. Fraunhofer lines which are unique to sunlight produce fingerprint information that characterizes sunlight. In contrast fluoescence produced by reflected sunlight does not have the Fraunhofer absorption lines. Thus, fluorescence caused by reflected sunlight can be sensed and measured by accurate comparison of light level within a selected Fraunhofer absorption line to the level in an adjacent spectral region in which there is no Fraunhofer absorption line. In its simplest form an apparatus for measuring fluorescence produced within a sunlit area of earth employs a narrow band filter tuned to pass a selected Fraunhofer absorption line, means to detect intensity of reflected light within the selected Fraunhofer line and means to detect intensity of reflected light just outside the selected Fraunhofer. Solution of a simple algebraic expression involving these two quantities provides the intensity of fluorescence of any given point on earth.

Various techniques have been developed to measure fluorescence within a sunlit scene. Some of these techniques are disclosed in U.S. Pat. Nos. 3,598,994; 3,641,344; and 3,769,516 all having the same assignee as the present invention.

While the above patents do not directly address it, a problem associated with present methods of Fraunhofer line discrimination is the narrow field of view through which the necessary discrimination data must be obtained. In many cases the field of view is 1° or less. This severely limits the width of the scene viewable by Fraunhofer line discriminators.

The present invention permits the detection of fluorescence over a much wider field of view from high altitudes with good spatial resolution without sacrifice of the narrow spectral interval imposed by the Fraunhofer absorption lines.

BRIEF SUMMARY OF THE INVENTION

The present invention comprises an apparatus for detecting fluorescence of a sunlit area of the earth's surface as viewed from space. An optical system adapted to be airborne includes a Fabry-Perot etalon designed to pass light of a selected Fraunhofer line from the viewed scene. A plurality of light detectors are disposed to sense light intensity within a selected ring of the fringe pattern produced by the Fabry-Perot etalon. A second like plurality of light detectors are disposed to sense light intensity just outside the selected fringe pattern ring. Electron means which are connected to the first and second plurality of light detectors solve a well known equation to provide a representation of fluorescence (and reflectivity) of the viewed scene. The selected ring determines the field of view of the system which may be as large as 10° or larger depending on the spatial resolution in the image and the sensitivity desired.

By providing the detectors around a semi-circular arc of the selected fringe and the detectors just outside of the motion of the airborne system relative to the earth provides a line scan of a swath of terrain 10° wide with the required spatial and spectral resolution. Pixel pair location and output timing must be selected from one of several techniques to yield faithful representation of fluorescence. By solving for fluorescence of each minute area viewed by individual pairs of detectors a record or real time mapping of the fluorescence pattern of a strip of earth may be obtained.

DESCRIPTION

Figure 1:
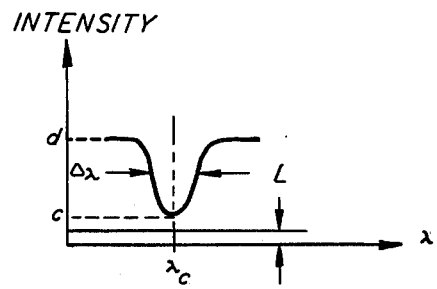
FIG. 1 is a graphical representation useful in understanding Fraunhofer line fluorescence discrimination.

Fluorescence L is calculated by solving the equation $$L = \frac{1}{a} \frac{(c - nd)}{(1 - n)}$$

where:
c = light intensity within the Fraunhofer line
d = light intensity outside the Fraunhofer line
n = is a constant representative of the depth of the Fraunhofer line
a = a proportionality constant FIG. 1 is a graph of light intensity versus wavelength showing light intensity of reflected sunlight over a portion of the spectrum where the Fraunhofer line is represented by $\lambda c$ over an average band of $\Delta\lambda$. While a Fraunhofer line is represented by a single number, e.g., 5890 angstroms, it does encompass a bandwidth generally not more than 0.5 angstroms. C is the reflectance of light within the Fraunhofer line and d is reflected light outside the Fraunhofer line. L represents the Luminescence, i.e., fluorescence caused by the reflected sunlight.

It should be noted that there are a number of materials that fluoresce in sunlight. These generally have a bandpass of several hundred angstroms. Many of these materials have associated Fraunhofer lines, i.e., the Fraunhofer lines have angstrom numbers somewhere within the wavelength range of the material to be detected. For example, aqueous solutions of Rohodamine WT dye has a bandpass of fluorescence of several hundred angstroms which encompass the Fraunhofer absorption line of 5890 angstroms. This makes possible the detection of the fluorescence and the intensity of fluorescence of the dye. Similarly, Sodium $D_2$ has a bandpass which emcompasses the 5895 angstrom Fraunhofer line. The present invention is capable of measuring the fluorescence of the above two materials as well as any material which fluoresces in sunlight for which there is a Fraunhofer line located in its wavelength range.

Figure 2:
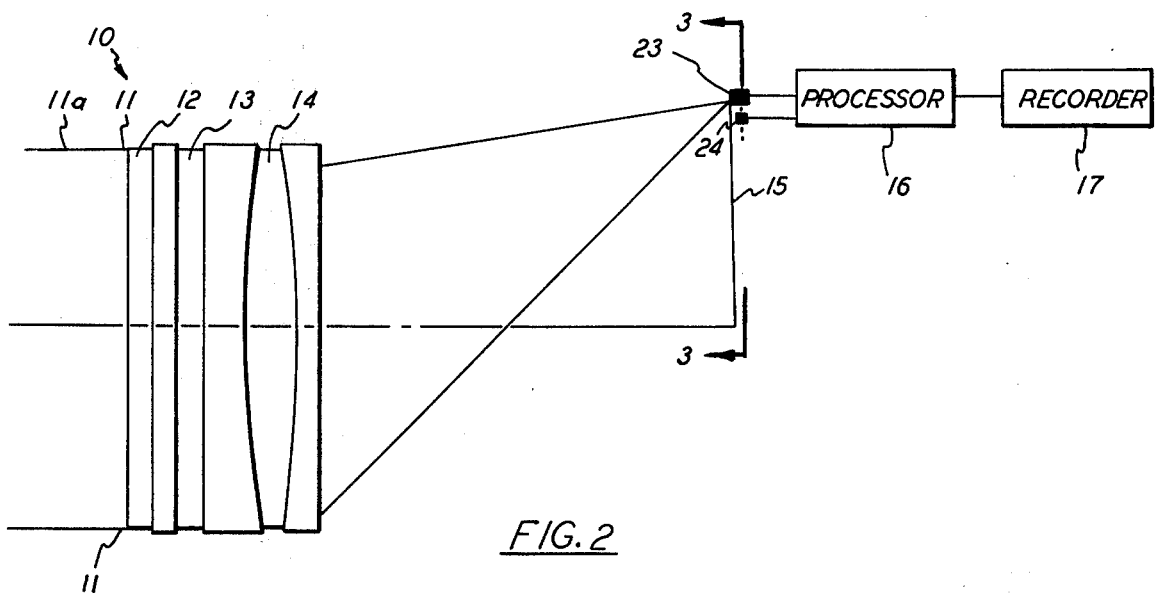
FIG. 2 is a schematic representation of an embodiment of the present invention.

FIG. 2 illustrates a preferred embodiment of the present invention generally denoted by reference numeral 10. For purposes of this description it is assumed that the material whose fluorescence is being measured is aqueous Rhodamine WT dye.

The apparatus of FIG. 2 comprises a cylindrical tube 11 the outer end 11a of which forms an opening for collecting light, i.e., reflected light from a sunlit scene on the surface of the earth or other planet or object disposed to receive light from the sun. The tube 11 is adapted to be fixed in an aircraft, spaceship or satellite pointing toward the scene to be viewed.

Figure 3:
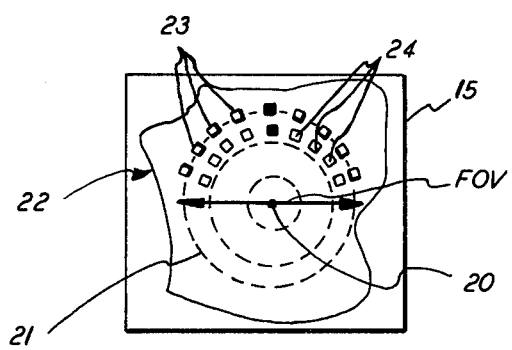
FIG. 3 is a view taken through line 3—3 of FIG. 2.

Fixedly disposed in tube 11 is an optical system comprising a blocking filter 12, a Fabry-Perot etalon 13 and a focusing lens 14. The Fabry-Perot etalon 13 is designed to pass light of a selected Fraunhofer line which in the case of Rhodamine dye is 5890 angstroms. As is well known in the art a Fabry-Perot etalon creates a ringed fringe pattern comprising a center 20 a number of concentric rings 21 as best seen in FIG. 3. The ring pattern is focused by means of focusing lens 14 on focal plane 15. In the present invention this fringe pattern is superimposed at the focal plane 15 on the scene 22 to be viewed. The blocking filter 12 which is preferably placed closest to the scene is a narrow passband filter of, e.g., ten angstroms centered on the Fraunhofer line selected by the Fabry-Perot etalon 13. The blocking filter 12 functions to prevent spectral aliasing or blocks the multiple pass bands of the Fabry-Perot etalon. The position of the blocking filter 12 in the optical system is not critical, e.g., its position may be exchanged with that of the Fabry-Perot etalon 13.

At the focal plane a plurality of light detectors 23, e.g., a milth anode microchannel array, Model F4149 obtainable from or ITT, hereinafter referred to as a MAMA tube, are disposed to receive light around a semi-circle of a selected outer ring of the fringe pattern. In a practical embodiment a ring was selected to give a field of view of 10° as the system scans the earth in line scan fashion. The size of the light detectors 23 must be such that each fits substantially within the selected ring, otherwise, they will not be sensing light which is entirely within the selected Fraunhofer line. Since the rings grow narrower in width as their radius increases, this is a practical limitaiton in the actual field of view obtainable, i.e., while detector devices may be made exceedingly small there is a limitation on their size. Spatial resolution or sensitivity requirement will in practice limit the ring selected. The 10° has been calculated to be achievable for 0.1 PPB sensivity and 1 milli-radian spatial resolution.

Each light detector 23 has a counterpart 24 disposed just outside of the selected ring. Thus, light detectors 23 sense reflected light c within the Fraunhofer line while light detectors 24 sense reflected light d just outside the selected Fraunhofer line.

Since light detectors such as MAMA tubes are very small many more than the number of light detectors 23 and 24 shown in FIG. 3 may be arranged in the semi-circle shown. The more light detectors that are used the better the spatial resolution, i.e., the viewed area is seen in much finer detail.

Each of the light detectors are connected to a processor 16 where the formula set forth above is solved for fluorescence for each associated pair of light detectors 23 and 24. The calculations are repeatedly performed at extremely short time intervals as the swatch of earth viewed moves relative to the system. The length of these time intervals is determined by the resolution desired. Detector pair location and output timing must be selected from one of several techniques to yield faithful representation of fluorescence. One technique utilizes a simple delay circuit in conjunction with proper detector spacing so that reflected light is received in both detectors from the same spot on the ground. It should be noted that the output from light detectors 24 must be correlated, e.g., by a simple delay circuit so that reflected light informaton to each associated light detector is from the same spot in the viewed scene. Each calculated output of fluorescence is fed into recorder 17 where it is recorded, e.g., in a memory or placed on other storage medium such as film to provide a pattern map of the fluorescence detected during the scanning operation. Reflectivity can also be calculated from the measured quantities and is an aid to interpretation of fluorescence images.

While the invention thus described functions adequately, it can be enhanced by improving the image in the semi-circular ring location of the selected ring by use of the annular field optical imaging system disclosed in U.S. Pat. No. 3,821,763 incorporated herein by reference and having the same assignee as the present invention. To obtain this enhancement the focusing lens 14 would be replaced by the optical system disclosed in the patent with the Fabry-Perot etalon being placed in collimated space between fore and aft-optics, i.e. at element 17 of the system shown in the above patent.

A spectral filter and associated blocking filters may be added to the system of the present invention, i.e., to the collimated space of the annular field optical imaging system. Adjustment of the filter off-axis passband fringe to the annular field image and the use of an appropriate array focal plane allows electronic imaging of the entire object field only in the desired spectral band as relative motion of field and system occurs.

Other modifications of the present invention are possible in light of the above description which should not be construed as placing limitations on the invention other than those specifically set forth in the claims which follow:

What is claimed is:

1. An apparatus for detecting fluorescence of materials in a sunlit scene, comprising,
   optical means directed to receive reflected sunlight from the scene,
   said optical means comprising,
   first means providing a fringe pattern of a preselected Fraunhofer line,
   second means focusing said fringe pattern at a predetermined focal plane,
   a first plurality of light detectors disposed to receive light from a selected ring in said fringe pattern,
   a second plurality of light detectors disposed to receive light away from said selected ring,
   each one of said second plurality of light detectors being adjacent an associated one of said first detector,
   processor means connected to said light detectors for calculating the fluorescence in the light detected from each individual spot in a scene viewed by each of said first plurality of light detectors.

2. An apparatus according to claim 1 wherein said first means comprises,
   a Fabry-Perot etalon.

3. An apparatus according to claim 2 wherein said first and second plurality of light detectors cover a semi-circle in and around said selected ring, respectively.

4. An apparatus according to claim 3 wherein said light detectors comprise,
   MAMA tubes.

5. An apparatus according to claim 4 wherein each of said light detectors is small enough to fit substantially within said selected ring.

6. An apparatus according to claim 5 wherein said optical means is disposed in an aircraft or spacecraft moving relative to the sunlit scene in an orientation to give the widest field of view.

7. An apparatus according to claim 6 wherein said processor performs the calculation for each pair of associated light detectors at predetermined intervals.

8. An apparatus according to claim 7 further including,
recording means for recording a fluorescence map pattern of the scene viewed.

9. An apparatus according to claim 8 wherein said recorder means comprises,
a photographic film.

10. An apparatus according to claim 8 wherein said recorder means comprises,
a computer memory.

11. An apparatus according to claims 9 or 10 further including,
blocking filter means for passing light in a band encompassing said Fraunhofer line.

12. An apparatus according to claim 11 wherein said second means comprises,
a lens system for improving the quality of the light image falling on said first and second plurality of light detectors.

13. An apparatus according to claim 12 further including,
a filter disposed in said lens system for passing only a desired spectral band.

* * * * *